(12) United States Patent
Gonze et al.

(10) Patent No.: US 7,981,198 B2
(45) Date of Patent: Jul. 19, 2011

(54) OVERLAP ZONED ELECTRICALLY HEATED PARTICULATE FILTER

(75) Inventors: Eugene V. Gonze, Pinckney, MI (US); Mark R. Chapman, Brighton, MI (US)

(73) Assignee: GM Global Technology Operations LLC

( * ) Notice: Subject to any disclaimer, the term of this patent is extended or adjusted under 35 U.S.C. 154(b) by 403 days.

(21) Appl. No.: 11/972,716

(22) Filed: Jan. 11, 2008

(65) Prior Publication Data

US 2009/0071338 A1    Mar. 19, 2009

Related U.S. Application Data

(60) Provisional application No. 60/972,332, filed on Sep. 14, 2007.

(51) Int. Cl.
| | |
|---|---|
| B01D 39/06 | (2006.01) |
| B01D 39/14 | (2006.01) |
| B01D 39/00 | (2006.01) |
| B01D 50/00 | (2006.01) |
| B01D 46/00 | (2006.01) |

(52) U.S. Cl. .............. 95/283; 55/522; 55/523; 55/524; 422/169; 422/170; 422/171; 422/172; 422/177; 422/178; 422/179; 422/180; 422/181; 422/182

(58) Field of Classification Search ............ 55/522–524; 422/169–182
See application file for complete search history.

(56) References Cited

U.S. PATENT DOCUMENTS

| | | | |
|---|---|---|---|
| 4,450,682 A * | 5/1984 | Sato et al. ............ | 60/286 |
| 4,505,726 A | 3/1985 | Takeuchi | |
| 4,516,993 A | 5/1985 | Takeuchi | |
| 4,535,589 A * | 8/1985 | Yoshida et al. ............ | 60/303 |
| 5,144,798 A * | 9/1992 | Kojima et al. ............ | 60/303 |
| 5,171,335 A * | 12/1992 | Kojima et al. ............ | 55/523 |
| 5,183,646 A * | 2/1993 | Anderson et al. ............ | 423/210 |
| 5,207,807 A * | 5/1993 | Manfre et al. ............ | 55/282.1 |
| 5,457,945 A * | 10/1995 | Adiletta ............ | 55/301 |
| 5,562,885 A * | 10/1996 | Bayer et al. ............ | 422/174 |
| 6,090,172 A * | 7/2000 | Dementhon et al. ............ | 55/282.3 |
| 6,176,896 B1 * | 1/2001 | Dementhon et al. ............ | 95/14 |
| 6,379,407 B1 * | 4/2002 | Blackwell et al. ............ | 55/282.3 |
| 6,540,816 B2 * | 4/2003 | Allie et al. ............ | 95/278 |

OTHER PUBLICATIONS

U.S. Appl. No. 11/557,715, filed Nov. 8, 2006, Gonze.*
U.S. Appl. No. 11/561,100, filed Nov. 17, 2006, Gonze.*
U.S. Appl. No. 11/561,108, filed Nov. 8, 2006, Gonze.*
U.S. Appl. No. 11/956,722, filed Nov. 8, 2006, Gonze.*

* cited by examiner

*Primary Examiner* — Walter D Griffin
*Assistant Examiner* — Amber Orlando (57) ABSTRACT

A system includes a particulate matter (PM) filter that includes an upstream end for receiving exhaust gas and a downstream end. A zoned heater is arranged spaced from the upstream end and comprises N zones, where N is an integer greater than one, wherein each of the N zones comprises M sub-zones, where M is an integer greater than or equal to one, and wherein the N zones and the M sub-zones are arranged in P layers, where P is an integer greater than one. A control module selectively activates at least a selected one of the N zones to initiate regeneration in downstream portions of the PM filter from the one of the N zones and deactivates non-selected ones of the N zones.

28 Claims, 9 Drawing Sheets

OVERLAP ZONED ELECTRICALLY HEATED PARTICULATE FILTER

CROSS-REFERENCE TO RELATED APPLICATIONS

This application claims the benefit of U.S. Provisional Application No. 60/972,332, filed on Sep. 14, 2007. This application is related to U.S. patent application Ser. Nos. 11/557,715 filed on Nov. 8, 2006, 11/561,108 filed on Nov. 17, 2006, 11/561,100 filed on Nov. 17, 2006, and 11/956,722 filed on Dec. 14, 2007. The disclosures of the above applications are incorporated herein by reference in their entirety.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to electrically heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A system includes a particulate matter (PM) filter that includes an upstream end for receiving exhaust gas and a downstream end. A zoned heater is arranged spaced from the upstream end and comprises N zones, where N is an integer greater than or equal to one, wherein each of the N zones comprises M sub-zones, where M is an integer greater than one, and wherein the N zones and the M sub-zones are arranged in P layers, where P is an integer greater than one. A control module selectively activates at least a selected one of the N zones to initiate regeneration in downstream portions of the PM filter from the one of the N zones and deactivates non-selected ones of the N zones.

A method includes providing a particulate matter (PM) filter including an upstream end for receiving exhaust gas and a downstream end, arranging a zoned heater spaced from the upstream end that includes N zones, where N is an integer greater than one, wherein each of the N zones comprises M sub-zones, and where M is an integer greater than or equal to one, and wherein the N zones and the M sub-zones are arranged in P layers, where P is an integer greater than one, and selectively activating at least a selected one of the N zones to initiate regeneration in downstream portions of the PM filter from the one of the N zones and deactivates non-selected ones of the N zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure utilizes a heater with zones. The electrical heater is spaced from the PM filter. In other words, the electric heater is located in front of the PM filter but is not in contact with the downstream PM filter. The heater selectively heats portions of the PM filter. The PM heater may be mounted close enough to the front of the PM filter to control the heating pattern. The length of the heater is set to optimize the exhaust gas temperature.

Thermal energy is transmitted from the heater to the PM filter by the exhaust gas. Therefore the PM filter is predominantly heated by convection. The electrical heater is divided into zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter is regenerated by selectively heating one or more of the zones in the front of the PM filter and igniting the soot using the heated exhaust gas. When a sufficient face temperature is reached, the heater is turned off and the burning soot then cascades down the length of the PM filter channel, which is similar to a burning fuse on a firework. In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclosure.

The burning soot is the fuel that continues the regeneration. This process is continued for each heating zone until the PM filter is completely regenerated.

The heater zones are spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient occurs at edges of the heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Figure 1:
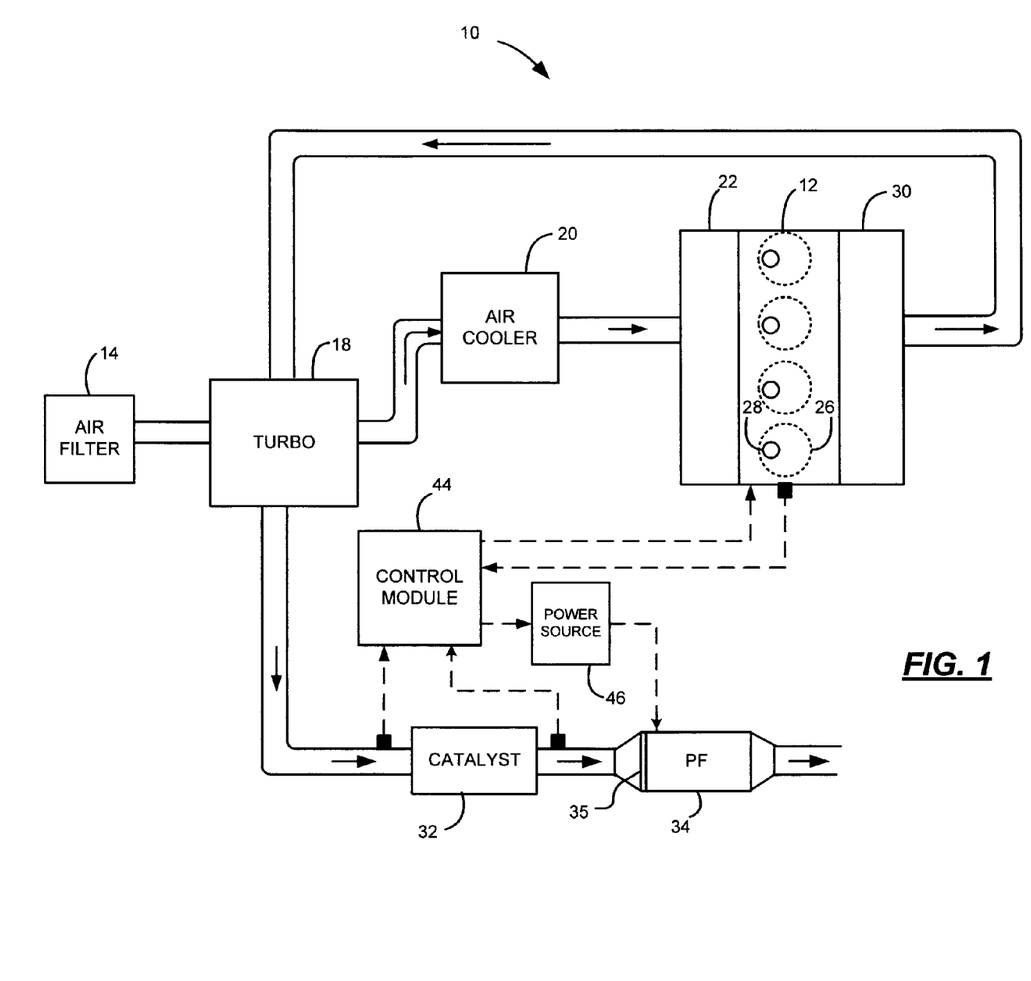
FIG. 1 is a functional block diagram of an exemplary engine including a particulate matter (PM) filter with a zoned inlet heater that is spaced from the PM filter.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with a zoned inlet heater 35. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the zoned heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The zoned inlet heater 35 is spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current is controlled to the PM filter assembly 34 via a power source 46 to initiate the regeneration process. The duration of the regeneration process may be varied based upon the estimated amount of particulate matter within the PM filter assembly 34.

Current is applied to the zoned heater 35 during the regeneration process. More specifically, the energy heats selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection. The remainder of the regeneration process is achieved using the heat generated by the heated exhaust passing through the PM filter.

Figure 2:
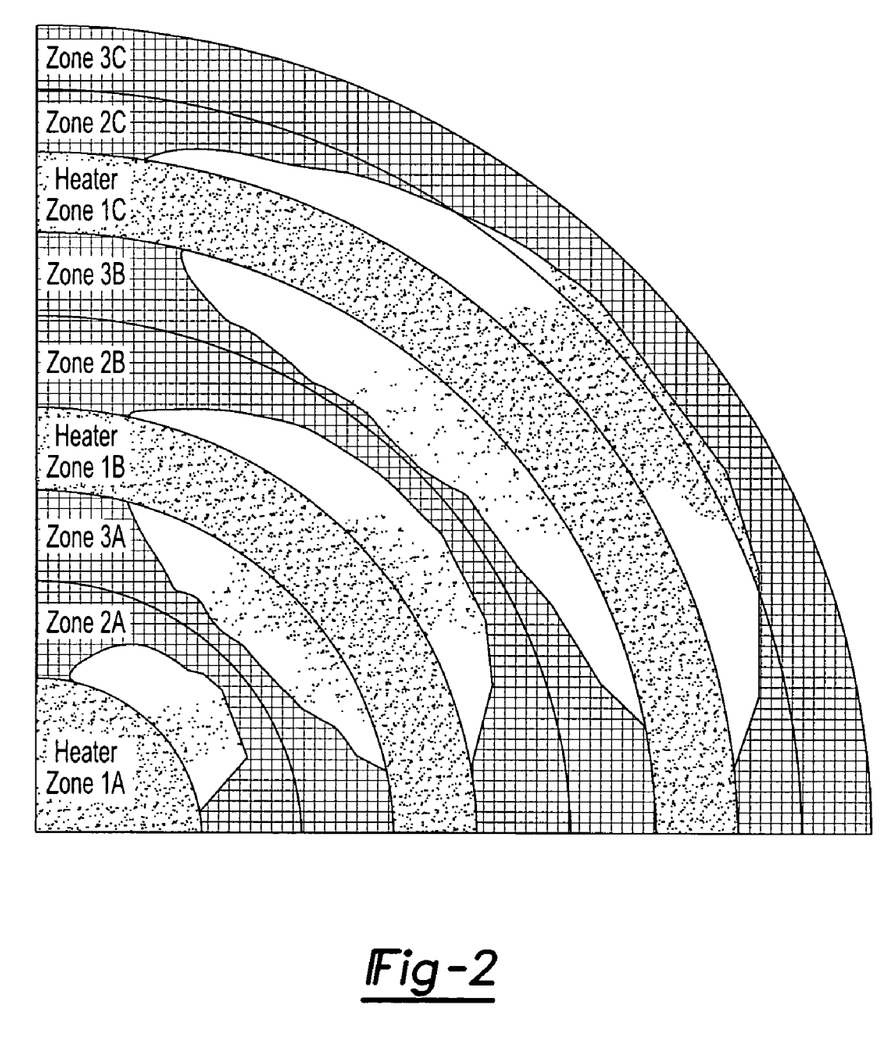
FIG. 2 illustrates exemplary zoning of the zoned inlet heater of the electrically heated particulate matter (PM) filter of FIG. 1 in further detail.

Referring now to FIG. 2, an exemplary zoned inlet heater 35 for the PM filter assembly 34 is shown in further detail. The zoned inlet heater 35 is arranged spaced from the PM filter assembly 34. The PM filter assembly 34 includes multiple spaced heater zones including zone 1 (with sub-zones 1A, 1B and 1 C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
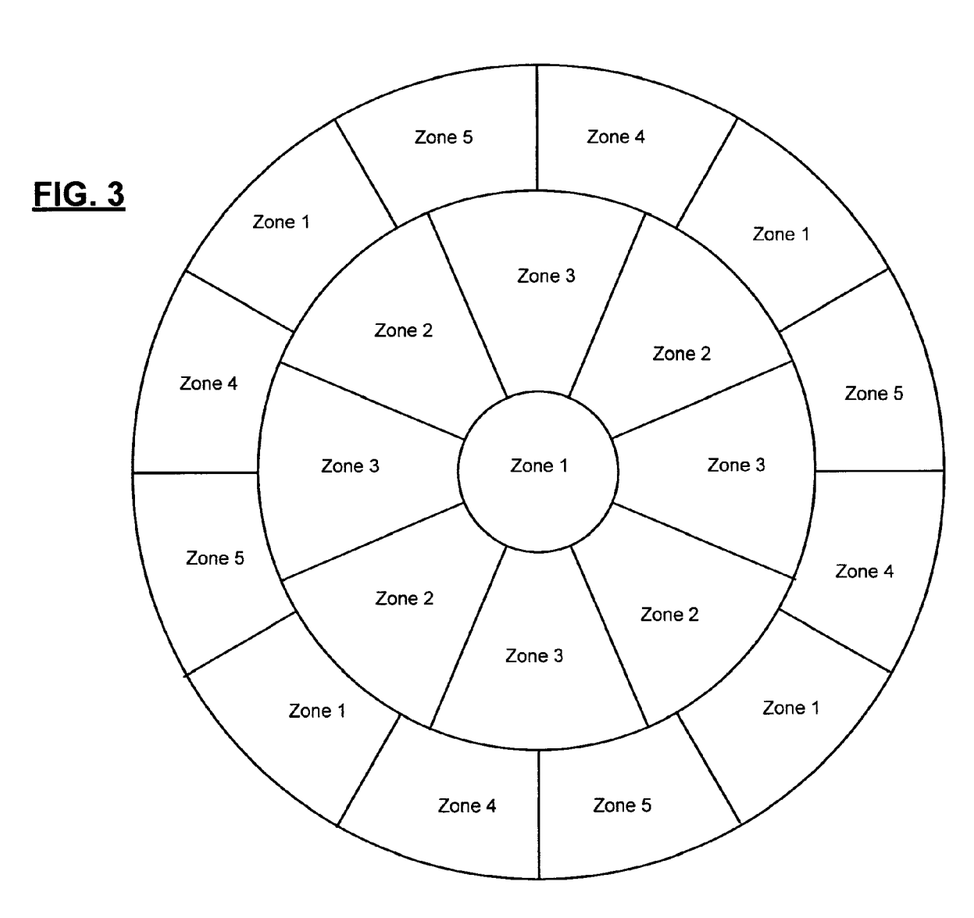
FIG. 3 illustrates exemplary zoning of the zoned inlet heater of the electrically heated PM filter of FIG. 1 in further detail.

Referring now to FIG. 3, another exemplary zoned inlet heater arrangement is shown. A center portion may be surrounded by a middle portion including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 4:
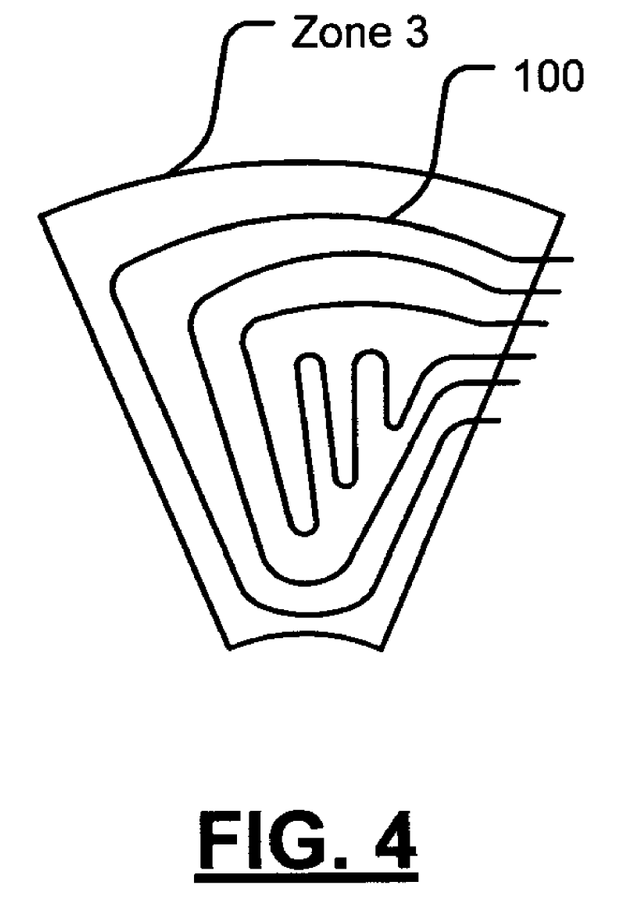
FIG. 4 illustrates an exemplary resistive heater in one of the zones of the zoned inlet heater of FIG. 3.

Referring now to FIG. 4, an exemplary resistive heater 100 arranged adjacent to one of the zones (e.g. zone 3) from the first circumferential band of zones in FIG. 3 is shown. The resistive heater 100 may comprise one or more coils that cover the respective zone to provide sufficient heating.

Figure 5:
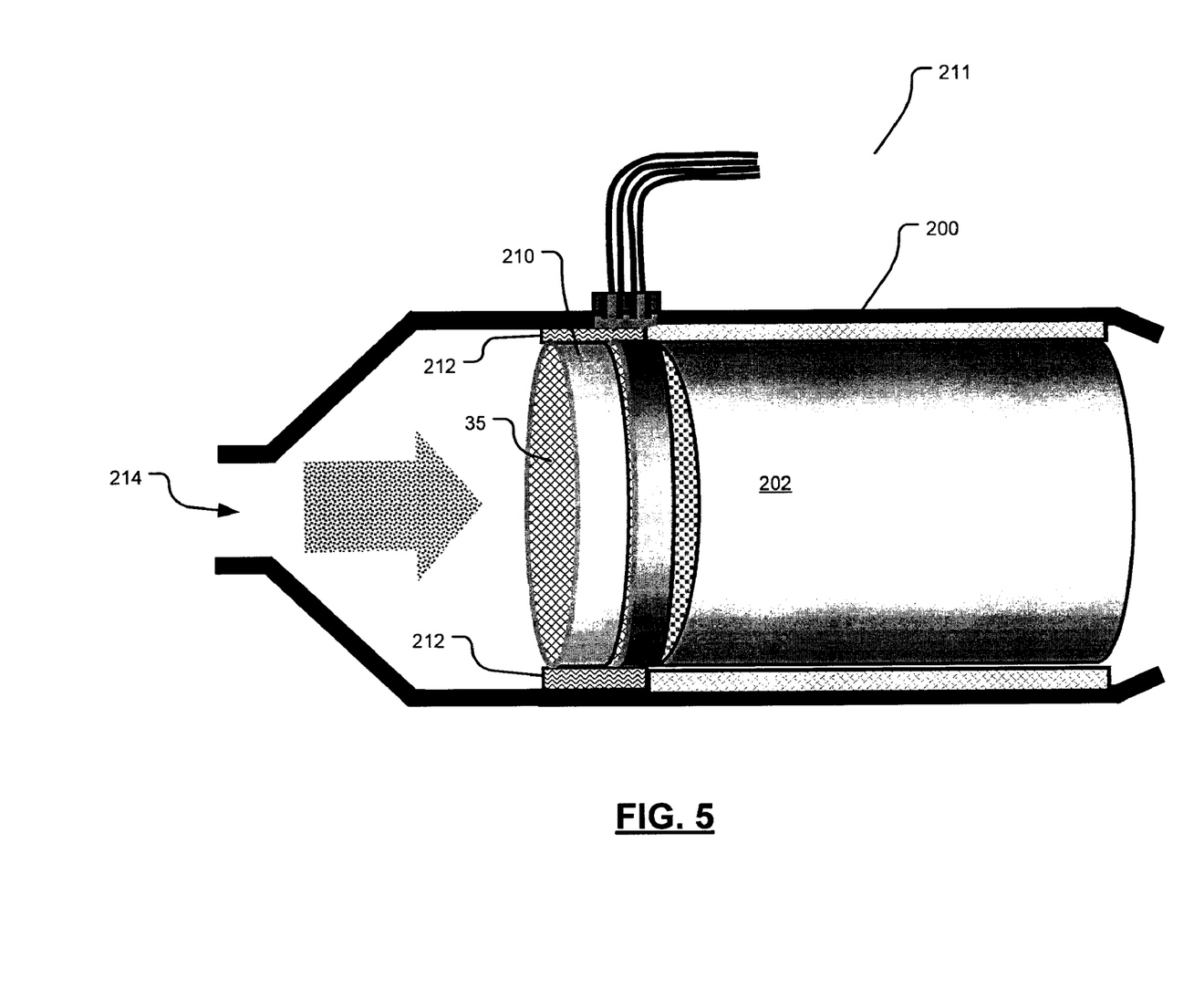
FIG. 5 illustrates the electrically heated PM filter having a zoned electric heater that is spaced from the PM filter.

Referring now to FIG. 5, the PM filter assembly 34 is shown in further detail. The PM filter assembly 34 includes a housing 200, a filter 202, and the zoned heater 35. The heater 35 may be arranged between a laminar flow element 210 and a substrate of the filter 202. An electrical connector 211 may provide current to the zones of the PM filter assembly 34 as described above.

As can be appreciated, the heater 35 may be spaced from the filter 202 such that the heating is predominantly convection heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas travels a distance and is received by the filter 202. The heater 35 may be spaced from and not in contact with the filter 202.

Figure 6:
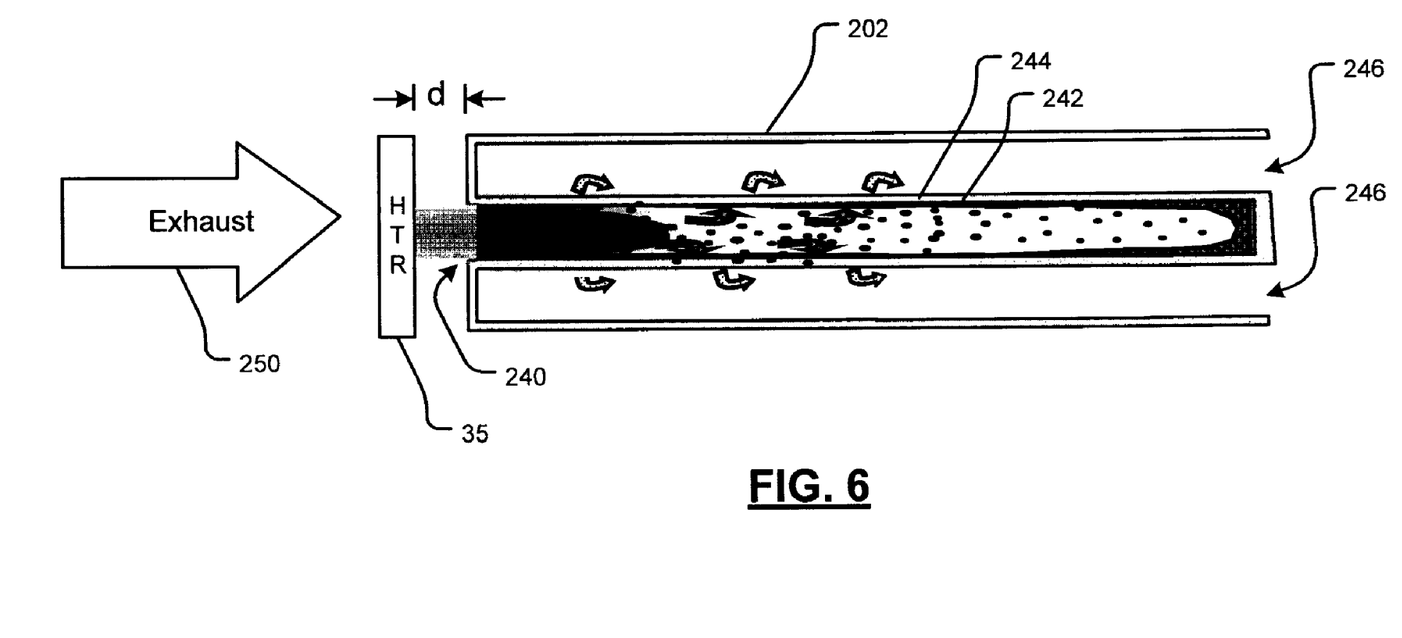
FIG. 6 illustrates heating within the zoned electric heater.

Referring now to FIG. 6, heating within the PM filter assembly 34 is shown in further detail. Exhaust gas 250 passes through the heater 35 and is heated by one or more zones of the heater 35. The heated exhaust gas travels a distance "d" and is then received by the filter 202. The distance "d" may be ½ or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
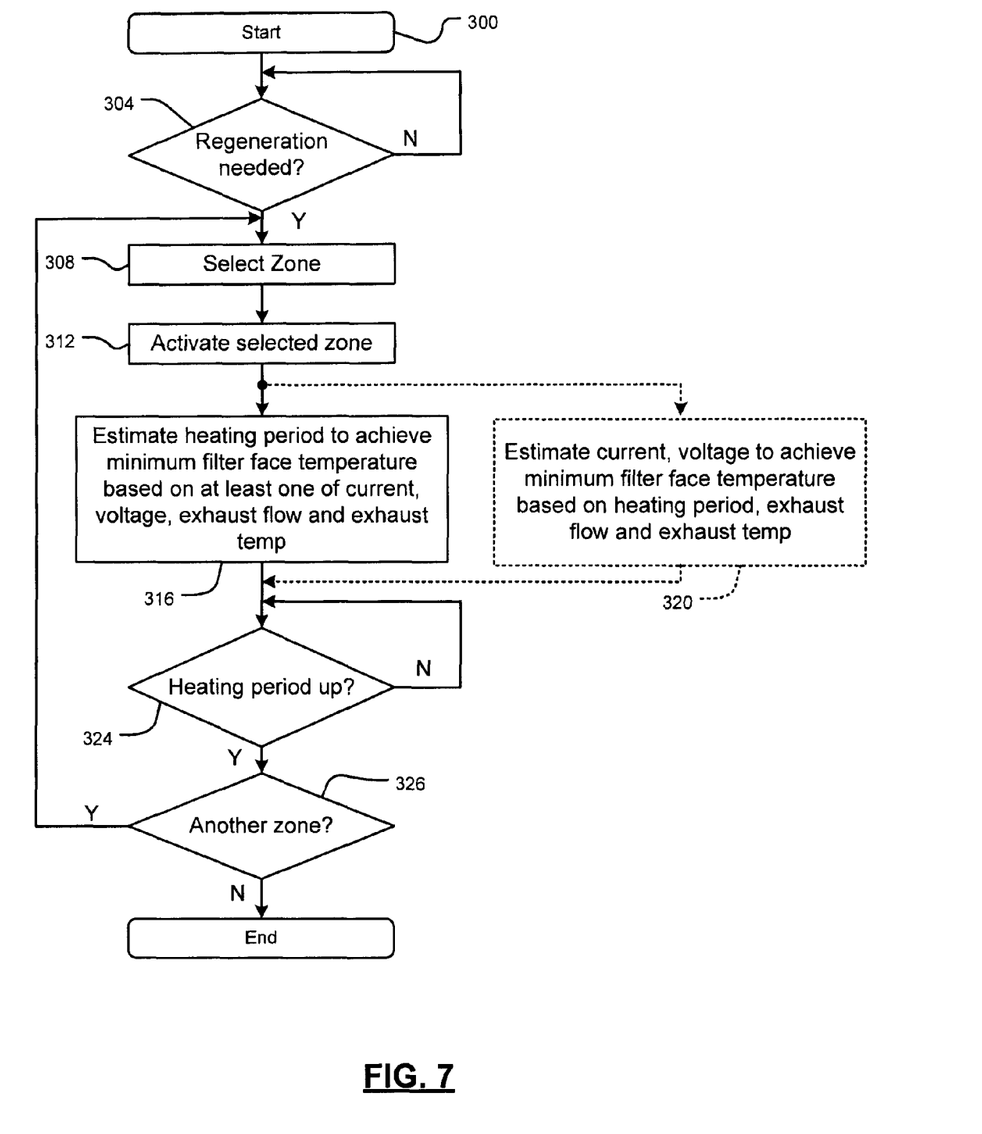
FIG. 7 is a flowchart illustrating steps performed by the control module to regenerate the PM filter.

Referring now to FIG. 7, steps for regenerating the PM filter are shown. In step 300, control begins and proceeds to step 304. If control determines that regeneration is needed in step 304, control selects one or more zones in step 308 and activates the heater for the selected zone in step 312. In step 316, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsius or greater. In an alternate step 320 to step 316, control estimates current and voltage needed to achieve minimum filter face temperature based on a predetermined heating period, exhaust flow and exhaust temperature.

In step 324, control determines whether the heating period is up. If step 324 is true, control determines whether additional zones need to be regenerated in step 326. If step 326 is true, control returns to step 308. Otherwise control ends.

In use, the control module determines when the PM filter requires regeneration. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

Figure 8A:
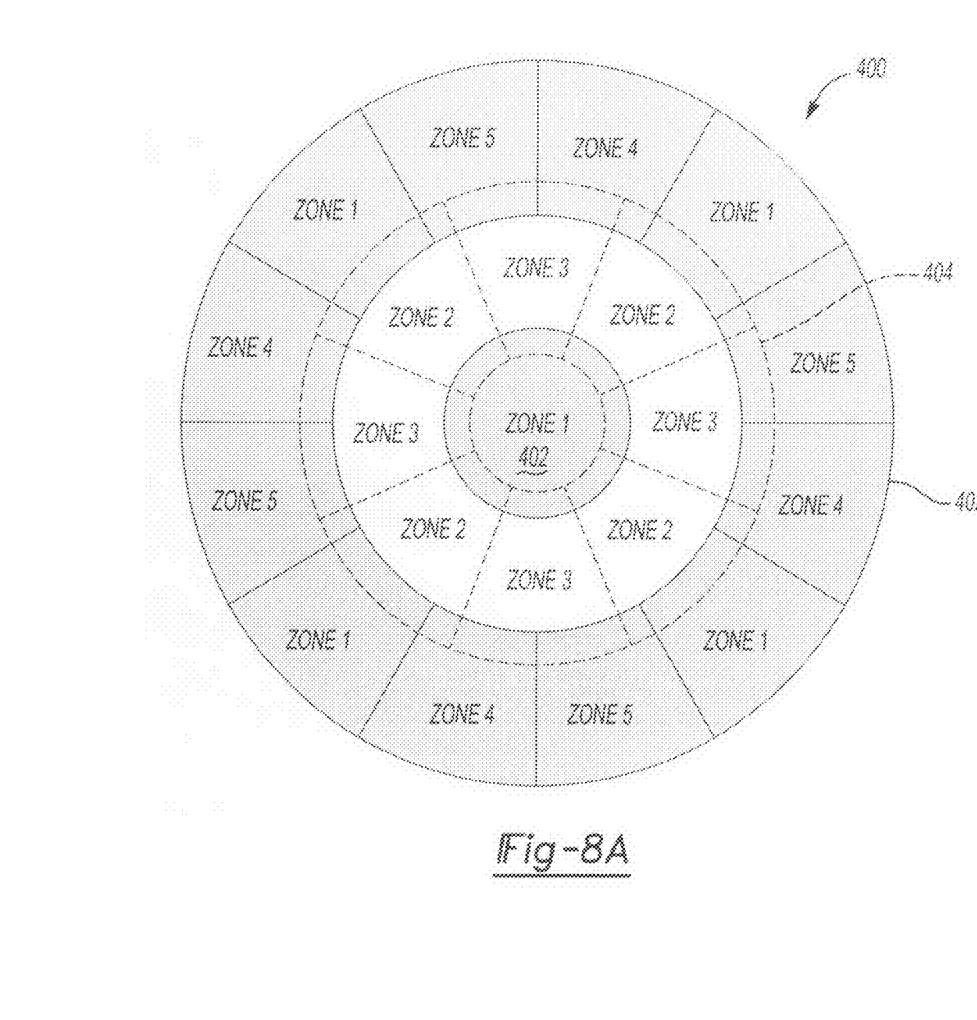
FIG. 8A illustrates exemplary overlapping zoning of a zoned inlet heater including multiple layers.
Figure 8B:
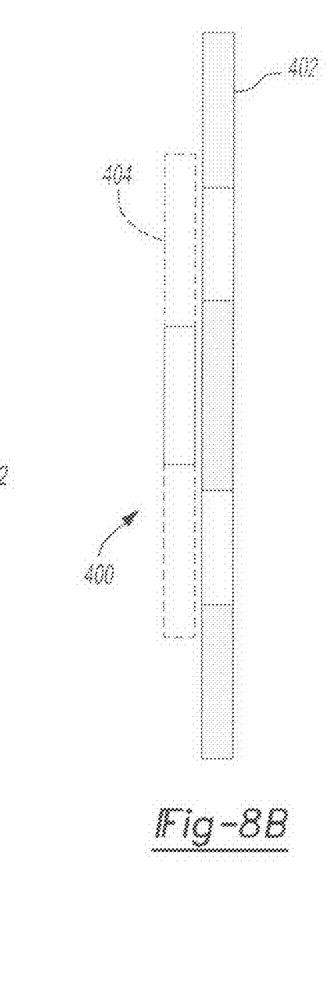
FIG. 8B illustrates a cross-section of exemplary overlapping zoning of the zoned inlet heater of FIG. 8A.

Referring now to FIGS. 8A and 8B, a zoned inlet heater 400 that includes a plurality of overlapping layers is shown. The plurality of layers are spaced apart in different planes (i.e. are not coplanar) as shown in cross section in FIG. 8B. When heater zones are activated as described above in FIGS. 1-7, the zones may thermally expand and/or shift. Individual heater zones may be spaced apart to allow for possible expansion and shifting. Consequently, soot may collect between heater zones within the PM filter. Overlapping layers of zones provide regeneration heating to regions of the PM filter that would typically correspond to spaces between heater zones.

For example, the zoned inlet heater 400 may include a first layer 402 (including zones 1, 4, and 5) and a second layer 404 (including zones 2 and 3). The zones of the first layer 402 are located in a first plane and the zones of the second layer 404 are located in a second plane and are spaced apart from the zones of the first layer 402. The zones of the first layer 402 overlap the zones of the second layer 404.

Figure 9A:
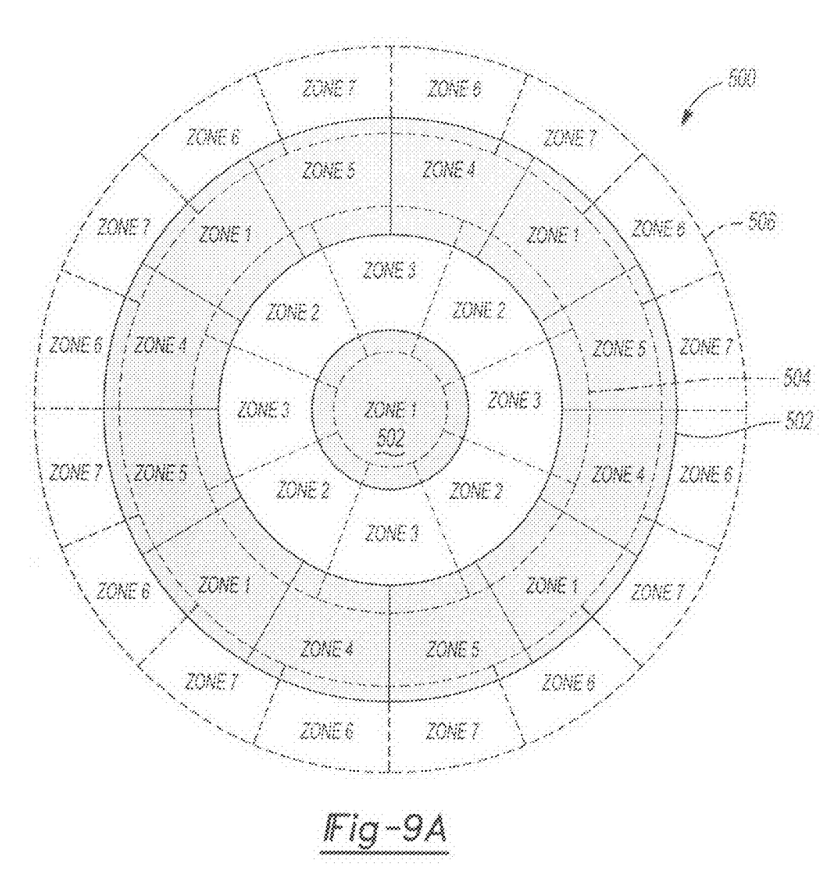
FIG. 9A illustrates exemplary overlapping zoning of a zoned inlet heater including three layers.
Figure 9B:
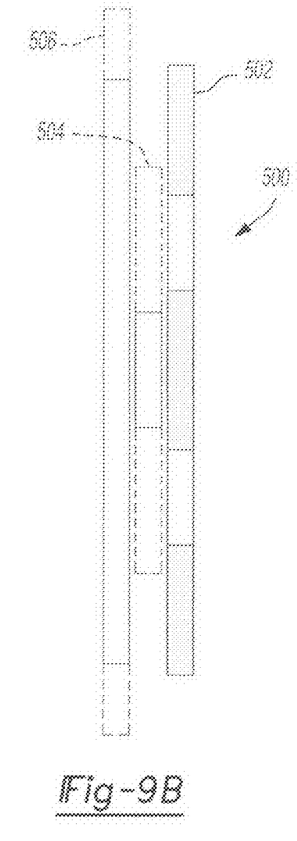
FIG. 9B illustrates a cross-section of exemplary overlapping zoning of the zoned inlet heater of FIG. 9A.

Referring now to FIGS. 9A and 9B, a zoned inlet heater 500 includes a first layer 502 (including zones 1, 4, and 5), a second layer 504 (including zones 2 and 3), and a third layer 506 (including zones 6 and 7). The zones of the first layer 502 are located in a first plane, the zones of the second layer 504 are located in a second plane, and the zones of the third layer 506 are located in a third plane. Each of the layers 502, 504, and 506 are spaced apart from each other. The zones of the first layer 502 overlap the zones of each of the second layer 504 and the third layer 506.

As shown in FIGS. 8A and 8B, the heater zones are located in two different layers. As shown in FIGS. 9A and 9B, the heater zones are located in three different layers. Those skilled in the art can appreciate that other implementations may include two, three, or more heater layers including zones arranged in any suitable configuration. The heater zones of each of the layers may be selectively activated and deactivated in any suitable manner such as those described in previous implementations shown in FIGS. 1-7. For example only, the heater zones may be activated sequentially such that when zone 1 is activated, zones 2-7 are deactivated and when zone 2 is activated, zones 1 and 3-7 are deactivated.

In another implementation, zones in non-adjacent layers may be activated at the same time. For example, as shown in FIGS. 9A and 9B, when zone 1 is activated, zone 6 may be activated and zones 2-5 and 7 may be deactivated. In other words, one of the zones in the first layer 502 may be activated at the same time as one of the zones in the non-adjacent third layer 506.

In another implementation, zones of adjacent layers may be activated at the same time when there is sufficient space between the zones (i.e. the zones of one layer do not overlap the zones of an adjacent layer). For example, as shown in FIG. 9B, the zones in the third layer 506 are spaced apart radially from the zones of the second layer 504. Accordingly, when zone 2 in the second layer 504 is activated, zone 7 in the third layer 506 may be activated and the remaining zones 1 and 3-6 may be deactivated. In another implementation, each of the second layer 504 and the third layer 506 includes zones 2 and 3. In other words, the third layer 506 may include the same zones as the second layer 504.

The present disclosure may substantially reduce the fuel economy penalty, decrease tailpipe temperatures, and improve system robustness due to the smaller regeneration time.

What is claimed is:

1. A system comprising:
a particulate matter (PM) filter that includes an upstream end for receiving exhaust gas and a downstream end;
a zoned heater that is spaced upstream from said upstream end and that comprises N zones, where N is an integer greater than one, wherein each of said N zones comprises M sub-zones, where M is an integer greater than or equal to one, and wherein said N zones and said M sub-zones are arranged in P layers, where P is an integer greater than one; and
a control module that selectively activates at least a selected one of said N zones to initiate regeneration in downstream portions of said PM filter from said one of said N zones and deactivates non-selected ones of said N zones.

2. The system of claim 1 wherein at least one of said N zones arranged in a first one of said P layers overlaps a second one of said N zones arranged in a second one of said P layers.

3. The system of claim 2 wherein said at least one of said N zones overlaps at least one of said second one and a third one of said N zones arranged in a third one of said P layers.

4. The system of claim 1 wherein at least one of said N zones includes at least one of said M sub-zones in a first one of said P layers and others of said M sub-zones in a second one of said P layers.

5. The system of claim 1 wherein each of said P layers is spaced apart from others of said P layers.

6. The system of claim 1 wherein said non-selected ones of said N zones provide stress mitigation zones.

7. The system of claim 1 wherein said N zones are located in a center portion, a first circumferential portion radially outside of said center portion and a second circumferential portion radially outside of said first circumferential portion.

8. The system of claim 7 wherein said center portion comprises a first zone and said second circumferential portion comprises said first zone, a second zone and a third zone.

9. The system of claim 8 where said first, second and third zones alternate around said second circumferential portion.

10. The system of claim 8 wherein said first circumferential portion comprises fourth and fifth zones that alternate.

11. The system of claim 1 wherein said control module estimates a heating period based on at least two of power supplied to said zoned heater, exhaust flow and exhaust temperature.

12. The system of claim 1 wherein said control module estimates a heating period to heat a face portion of said PM filter a temperature greater than or equal to a predetermined temperature and shuts down said zoned heater after said heating period.

13. The system of claim 12 wherein said predetermined temperature is 700 degrees Celsius.

14. The system of claim 1 wherein said zoned heater is spaced a distance less than or equal to ½ inch.

15. A method comprising:
providing a particulate matter (PM) filter that includes an upstream end for receiving exhaust gas and a downstream end;
arranging a zoned heater upstream from said upstream end that comprises N zones, where N is an integer greater than one, wherein each of said N zones comprises M sub-zones, where M is an integer greater than or equal to one, and wherein said N zones and said M sub-zones are arranged in P layers, where P is an integer greater than one; and
selectively activating at least a selected one of said N zones to initiate regeneration in downstream portions of said PM filter from said one of said N zones and deactivates non-selected ones of said N zones.

16. The method of claim 15 wherein at least one of said N zones arranged in a first one of said P layers overlaps a second one of said N zones arranged in a second one of said P layers.

17. The method of claim 16 wherein said at least one of said N zones overlaps at least one of said second one and a third one of said N zones arranged in a third one of said P layers.

18. The method of claim 15 wherein at least one of said N zones includes at least one of said M sub-zones in a first one of said P layers and others of said M sub-zones in a second one of said P layers.

19. The method of claim 15 wherein each of said P layers is spaced apart from others of said P layers.

20. The method of claim 19 wherein said non-selected ones of said N zones provide stress mitigation zones.

21. The method of claim 19 wherein said N zones are located in a center portion, a first circumferential portion radially outside of said center portion and a second circumferential portion radially outside of said first circumferential portion.

22. The method of claim 21 wherein said center portion comprises a first zone and said second circumferential portion comprises said first zone, a second zone and a third zone.

23. The method of claim 22 where said first, second and third zones alternate around said second circumferential portion.

24. The method of claim 22 wherein said first circumferential portion comprises fourth and fifth zones that alternate.

25. The method of claim 19 further comprising estimating a heating period based on at least two of power supplied to said zoned heater, exhaust flow and exhaust temperature.

26. The method of claim 19 further comprising estimating a heating period to heat a face portion of said PM filter a temperature greater than or equal to a predetermined temperature and shutting down said zoned heater after said heating period.

27. The method of claim 26 wherein said predetermined temperature is 700 degrees Celsius.

28. The method of claim 15 wherein said zoned heater is spaced a distance less than or equal to ½ inch.

* * * * *